United States Patent
Inui et al.

(10) Patent No.: US 11,458,590 B2
(45) Date of Patent: Oct. 4, 2022

(54) ABRASIVE SLURRY REGENERATION METHOD

(71) Applicant: Konica Minolta, Inc., Tokyo (JP)

(72) Inventors: Chie Inui, Hino (JP); Akihiro Maezawa, Hino (JP); Yuuki Nagai, Tachikawa (JP); Natsumi Hirayama, Kyoto (JP)

(73) Assignee: KONICA MINOLTA, INC., Tokyo (JP)

( * ) Notice: Subject to any disclaimer, the term of this patent is extended or adjusted under 35 U.S.C. 154(b) by 596 days.

(21) Appl. No.: 15/775,128

(22) PCT Filed: Dec. 1, 2016

(86) PCT No.: PCT/JP2016/085679
§ 371 (c)(1),
(2) Date: May 10, 2018

(87) PCT Pub. No.: WO2017/098986
PCT Pub. Date: Jun. 15, 2017

(65) Prior Publication Data
US 2018/0339399 A1  Nov. 29, 2018

(30) Foreign Application Priority Data
Dec. 9, 2015 (JP) .............................. JP2015-239870

(51) Int. Cl.
*B24B 57/02* (2006.01)
*C09G 1/02* (2006.01)
*C09G 1/04* (2006.01)

(52) U.S. Cl.
CPC ................ *B24B 57/02* (2013.01); *C09G 1/02* (2013.01); *C09G 1/04* (2013.01)

(58) Field of Classification Search
CPC ........ B28D 5/007; B28D 5/0076; C09G 1/02; C09G 1/04; B24B 57/00; B24B 57/02; B24B 57/04; B24B 55/12
See application file for complete search history.

(56) References Cited

U.S. PATENT DOCUMENTS

| | | | | |
|---|---|---|---|---|
| 2003/0022502 | A1* | 1/2003 | Matsui | H01L 21/7684 438/692 |
| 2005/0050803 | A1* | 3/2005 | Amanokura | C23F 3/04 51/309 |

(Continued)

FOREIGN PATENT DOCUMENTS

| EP | 2796243 A1 | 10/2014 |
|---|---|---|
| EP | 3109022 A1 | 12/2016 |

(Continued)

OTHER PUBLICATIONS

International Search Report dated Jan. 10, 2017 from the corresponding International Application No. PCT/JP2016/085679 and English translation.

(Continued)

*Primary Examiner* — Joel D Crandall
(74) *Attorney, Agent, or Firm* — Lucas & Mercanti, LLP

(57) ABSTRACT

An object of the present invention is to provide an abrasive slurry regeneration method capable of efficiently regenerating an abrasive slurry having a high polishing rate. The abrasive slurry regeneration method is an abrasive slurry regeneration method for polishing a polishing target containing silicon oxide as a main component using an abrasive slurry containing abrasive particles and a plurality of kinds of additives and then regenerating a collected abrasive slurry, characterized by including a regeneration step of collecting an additive having a molecular weight of 500 or more and an additive adsorbed by the abrasive particles among additives contained in the collected abrasive slurry (Continued)

together with the abrasive particles while an abrasive concentration (% by mass) is maintained within a range of 0.2 to 3000% with respect to an abrasive concentration (% by mass) of an unused abrasive slurry when being used for polishing a polishing target.

13 Claims, 3 Drawing Sheets

(56) References Cited

U.S. PATENT DOCUMENTS

| | | | | |
|---|---|---|---|---|
| 2011/0219704 A1* | 9/2011 | Moon | ............... | C09K 3/14 51/309 |
| 2014/0331567 A1* | 11/2014 | Takahashi | ............... | B24B 57/02 51/298 |
| 2015/0121769 A1* | 5/2015 | Nagai | ............... | B24B 57/02 51/298 |
| 2015/0132955 A1* | 5/2015 | Yamato | ............... | H01L 21/31055 438/692 |

FOREIGN PATENT DOCUMENTS

| | | |
|---|---|---|
| JP | H06-254764 A | 9/1994 |
| JP | 2002-114967 A | 4/2002 |
| JP | 2003-136406 A | 5/2003 |
| JP | 2003-205460 A | 7/2003 |
| JP | 2013-222863 A | 10/2013 |
| WO | 2013/099143 A1 | 7/2013 |

OTHER PUBLICATIONS

Written Opinion of the international Searching Authority dated Jan. 10, 2017 from the corresponding International Application No. PCT/2016/085679 and English translation.
Extended European Search Report dated Nov. 7, 2018 from corresponding European Application No. 16872884.8.
JPO, Office Action for the corresponding Japanese patent application No. 2017-555033, dated Jul. 21, 2020, with English translation.

* cited by examiner

ABRASIVE SLURRY REGENERATION METHOD

CROSS REFERENCE TO RELATED APPLICATION

This Application is a 371 of PCT/JP2016/085679 filed on Dec. 1, 2016 which, in turn, claimed the priority of Japanese Patent Application No. 2015-239870 filed on Dec. 9, 2015, both applications are incorporated herein by reference.

TECHNICAL FIELD

The present invention relates to an abrasive slurry regeneration method. Particularly, the present invention relates to an abrasive slurry regeneration method capable of efficiently regenerating an abrasive slurry having a high polishing rate.

BACKGROUND ART

In recent years, frequency of use of a glass material has increased as use for a glass disk, a quartz wafer, a liquid crystal panel, or the like, and it is often essential for a surface of the glass material to be polished in a mirror surface shape. As a method for polishing the glass material, a chemical mechanical polishing (CMP) technique for polishing the glass material in a state where an abrasive slurry is interposed between a polishing member such as a polishing pad and the glass material is generally adopted.

If the content of a polishing target such as fine glass pieces in the abrasive slurry is increased by polishing, a polishing rate is lowered. Therefore, the abrasive slurry is usually discarded after use for a certain period of time.

As a main element constituting abrasive particles contained in the abrasive slurry, a rare metal obtained from a mineral that is produced in a small amount or not produced in Japan is also included. The materials are valuable resources some of which depend on import, and many of the materials are expensive as a material price. Furthermore, the materials are important materials used in a large amount as abrasive particles. Therefore, it is strongly desired to effectively use a valuable material by collecting an abrasive slurry used in a polishing step, then regenerating the abrasive slurry, and using the abrasive slurry as a regenerated abrasive slurry.

Therefore, for example, a method is disclosed in which a dispersant or an electrolyte for dissolving a component derived from a polishing target is added to regenerate an abrasive slurry in order to remove a component derived from the polishing target from a collected abrasive slurry (for example, see Patent Literatures 1 and 2).

Here, the abrasive slurry may contain, together with abrasive particles (also referred to as abrasive grains) as a main component, an additive such as a stabilizer or a cleaning agent (hereinafter, an additive having an ability to increase a polishing rate is also referred to as an additive A) in order to improve dispersibility, cleaning performance, abrasiveness, and the like of the abrasive particles during polishing and to increase the polishing rate. In addition, the abrasive slurry may contain an additive such as an antibacterial agent, an antiseptic agent, or an antifreezing agent from a viewpoint of storage from manufacture to actual use for polishing or maintenance of stability during transport (for example, see Patent Literatures 3 and 4). The additive includes an additive having a function of lowering a polishing rate (hereinafter, an additive having an ability to lower the polishing rate is also referred to as an additive B).

The additive B is an unnecessary material from a viewpoint of maintaining and improving the polishing rate in a regenerated abrasive slurry often used immediately after regeneration.

However, according to the techniques described in the above Patent Literatures 1 and 2, the additive A may be removed by a regeneration step, or the additive B may remain in a regenerated abrasive slurry. Therefore, in order to obtain a regenerated abrasive slurry having a high polishing rate, it is necessary to add the additive A again or to remove the additive B after the regeneration step, and it is difficult to efficiently obtain an abrasive slurry having a high polishing rate.

CITATION LIST

Patent Literature

Patent Literature 1: JP 6-254764 A
Patent Literature 2: JP 2003-205460 A
Patent Literature 3: JP 2002-114967 A
Patent Literature 4: JP 2013-222863 A

SUMMARY OF INVENTION

Technical Problem

The present invention has been achieved in view of the above problems and circumstances, and an object thereof is to provide an abrasive slurry regeneration method capable of efficiently regenerating an abrasive slurry having a high polishing rate.

Solution to Problem

As a result of studies for causes and the like of the above problems in order to solve the above problems according to the present invention, it has been found that an abrasive slurry having a high polishing rate can be efficiently regenerated if an abrasive slurry regeneration method for polishing a polishing target containing silicon oxide as a main component using an abrasive slurry containing abrasive particles and a plurality of kinds of additives and then regenerating a collected abrasive slurry includes a regeneration step of collecting an additive having a molecular weight of 500 or more and an additive adsorbed by the abrasive particles among additives contained in a collected abrasive slurry together with the abrasive particles, and the present invention has been accomplished.

That is, the problems according to the present invention are solved by the following means.

1. An abrasive slurry regeneration method for polishing a polishing target containing silicon oxide as a main component using an abrasive slurry containing abrasive particles and a plurality of kinds of additives and then regenerating a collected abrasive slurry, characterized by including
a regeneration step of collecting an additive having a molecular weight of 500 or more and an additive adsorbed by the abrasive particles among additives contained in the collected abrasive slurry together with the abrasive particles while an abrasive concentration (% by mass) is maintained within a range of 0.2 to 3000% with respect to an abrasive concentration (% by mass) of an unused abrasive slurry when being used for polishing the polishing target.

2. The abrasive slurry regeneration method according to the first item, in which the regeneration step is performed while the abrasive concentration (% by mass) is maintained within a range of 1 to 3000% with respect to the abrasive concentration (% by mass) of the unused abrasive slurry when being used for polishing the polishing target.

3. The abrasive slurry regeneration method according to the first item, in which the regeneration step is performed while the abrasive concentration (% by mass) is maintained within a range of 0.2 to 1000% with respect to the abrasive concentration (% by mass) of the unused abrasive slurry when being used for polishing the polishing target.

4. The abrasive slurry regeneration method according to any one of the first to third items, in which the regeneration step is performed while the abrasive concentration (% by mass) is maintained within a range of 1 to 1000% with respect to the abrasive concentration (% by mass) of the unused abrasive slurry when being used for polishing the polishing target.

Advantageous Effects of Invention

The present invention can provide an abrasive slurry regeneration method capable of efficiently regenerating an abrasive slurry having a high polishing rate.

An exhibition mechanism or an action mechanism of an effect of the present invention has not been clarified but is estimated as follows.

Whether an additive is adsorbed by abrasive particles depends on a ratio of a hydrophobic group or a hydrophilic group included in the additive, a van der Waals force, the pH of an abrasive slurry, an abrasive concentration, a concentration of a polishing target, and the like.

Among additives contained in a collected abrasive slurry, many additives having a function of lowering a polishing rate have a molecular weight of less than 500 or are hardly adsorbed by abrasive particles under the above conditions. Many additives having a function of increasing the polishing rate have a molecular weight of 500 or more or are easily adsorbed by abrasive particles under the above conditions.

In the present invention, when the regeneration step is performed, by maintaining an abrasive concentration (% by mass) within a range of 0.2 to 3000% with respect to an abrasive concentration (% by mass) of an unused abrasive slurry when being used for polishing a polishing target, an additive having a molecular weight of 500 or more and an additive adsorbed by the abrasive particles among additives contained in a collected abrasive slurry can be easily collected.

This is because, by setting the abrasive concentration to 0.2% or more, it is possible to suppress an extremely large increase in the amount of a solvent (mainly water) in the abrasive slurry, to adjust the pH of the abrasive slurry within a predetermined range, and to suppress desorption of the additive adsorbed by the abrasive particles. In addition, by suppressing an increase in the amount of the solvent, it is possible to suppress collapse of a balance between a hydrophilic group and a hydrophobic group of the additive due to hydrolysis or the like and to suppress desorption of the additive adsorbed by the abrasive particles.

Meanwhile, by setting the abrasive concentration to 3000% or less, it is possible to maintain the viscosity of the abrasive slurry at a low value, to reduce the amount of adhesion loss to an inside of a container, a device, or the like where the regeneration step is performed, and to improve a collection ratio.

Therefore, by collecting an additive having a molecular weight of 500 or more and an additive adsorbed by the abrasive particles among additives contained in a collected abrasive slurry together with the abrasive particles while the abrasive concentration in the regeneration step is maintained within the above range, it is possible to efficiently obtain an abrasive slurry mainly containing the abrasive particles and the additive A with a high collection ratio. In addition, the obtained abrasive slurry mainly contains the abrasive particles and the additive A. Therefore, according to the above method, an abrasive slurry having a high polishing rate can be obtained.

DESCRIPTION OF EMBODIMENTS

Figure 1:
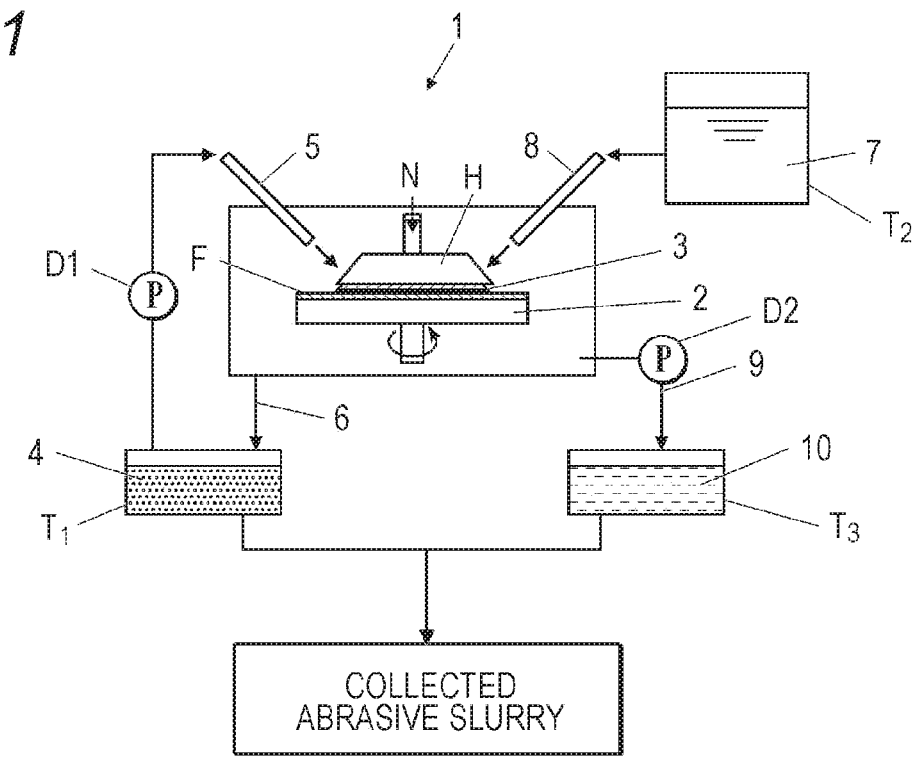
FIG. 1 is a schematic configuration diagram of a polishing machine according to the present embodiment.

An abrasive slurry regeneration method of the present invention is an abrasive slurry regeneration method for polishing a polishing target containing silicon oxide as a main component using an abrasive slurry containing abrasive particles and a plurality of kinds of additives and then regenerating a collected abrasive slurry, characterized by including a regeneration step of collecting an additive having a molecular weight of 500 or more and an additive adsorbed by the abrasive particles among additives contained in the collected abrasive slurry together with the abrasive particles while an abrasive concentration (% by mass) is maintained within a range of 0.2 to 3000% with respect to an abrasive concentration (% by mass) of an unused abrasive slurry when being used for polishing the polishing target. This characteristic is a technical characteristic common or corresponding to claims.

In the abrasive slurry regeneration method of the present invention, the regeneration step is preferably performed while an abrasive concentration (% by mass) is maintained within a range of 1 to 3000% with respect to an abrasive concentration (% by mass) of an unused abrasive slurry when being used for polishing the polishing target. This makes it possible to reduce the number of defects generated when polishing is performed using the regenerated abrasive slurry obtained.

In addition, in the abrasive slurry regeneration method of the present invention, the regeneration step is preferably performed while an abrasive concentration (% by mass) is maintained within a range of 0.2 to 1000% with respect to an abrasive concentration (% by mass) of an unused abrasive slurry when being used for polishing the polishing target. This makes it possible to set the viscosity of the abrasive slurry within a more appropriate range and to improve an abrasive collection ratio.

In addition, in the abrasive slurry regeneration method of the present invention, the regeneration step is preferably performed while an abrasive concentration (% by mass) is maintained within a range of 1 to 1000% with respect to an abrasive concentration (% by mass) of an unused abrasive slurry when being used for polishing the polishing target. This makes it possible to reduce the number of defects generated when polishing is performed using the regenerated abrasive slurry obtained and to improve an abrasive collection ratio.

Hereinafter, the present invention, constituent elements thereof, and embodiments and modes for performing the present invention will be described in detail. Note that "to" used in the present invention represents a numerical range including numerical values described before and after "to" as a lower limit value and an upper limit value.

<<Outline of Abrasive Slurry Regeneration Method>>

The abrasive slurry regeneration method of the present invention is an abrasive slurry regeneration method for polishing a polishing target containing silicon oxide as a main component using an abrasive slurry containing abrasive particles and a plurality of kinds of additives and then regenerating a collected abrasive slurry, including a regeneration step of collecting an additive having a molecular weight of 500 or more and an additive adsorbed by the abrasive particles among additives contained in the collected abrasive slurry together with the abrasive particles while an abrasive concentration (% by mass) is maintained within a range of 0.2 to 3000% with respect to an abrasive concentration (% by mass) of an unused abrasive slurry when being used for polishing a polishing target.

Here, the polishing target containing silicon oxide as a main component means a polishing target containing silicon oxide in an amount of 50% by mass or more.

In addition, in the regeneration step according to the present invention, the additive adsorbed by the abrasive particles is collected together with the abrasive particles regardless of a molecular weight.

<<Preparation Flow of Regenerated Abrasive Slurry>>

[Polishing Step]

First, a polishing step of polishing a polishing target will be described with reference to FIG. 1. After the polishing step, a collected abrasive slurry containing abrasive particles and the like is obtained.

FIG. 1 is a schematic configuration diagram of a polishing machine according to the present embodiment.

If polishing a glass lens is taken as an example, the polishing step generally includes a plurality of processes such as preparation of an abrasive slurry, polishing, and cleaning a polishing portion.

A polishing machine 1 illustrated in FIG. 1 includes a polishing surface plate 2 to which a polishing cloth F formed of a nonwoven fabric, a synthetic resin foam, a synthetic leather, or the like is attached. The polishing surface plate 2 is rotatable.

During a polishing operation, while a polishing target 3 containing silicon oxide as a main component is pressed against the polishing surface plate 2 with a predetermined pressing force N using a rotatable holder H, the polishing surface plate 2 and the holder H are rotated. At the same time, an abrasive slurry 4 prepared in advance is supplied from a slurry nozzle 5 via a pump D1. The abrasive slurry 4 (used abrasive slurry) after being used in the polishing step is stored in a slurry tank $T_1$ through a flow path 6 and circulated repeatedly between the polishing machine 1 and the slurry tank $T_1$.

In addition, if necessary, cleaning water 7 stored in a cleaning water storage tank $T_2$ is blown onto a polishing portion from a cleaning water injection nozzle 8 to clean the polishing machine 1 and the polishing target 3. A cleaning liquid 10 (used abrasive slurry) containing the abrasive particles after cleaning is stored in a cleaning liquid storage tank $T_3$ through a flow path 9 via a pump D2.

The cleaning liquid storage tank $T_3$ is a tank for storing the cleaning liquid 10 after being used for cleaning (rinsing). An inside of the cleaning liquid storage tank $T_3$ is stirred by a stirring blade (not illustrated) all the time in order to prevent precipitation and aggregation of abrasive particles and the like.

The cleaning liquid 10 containing the abrasive slurry 4 generated by polishing and stored in the slurry tank $T_1$ and abrasive particles stored in the cleaning liquid storage tank $T_3$ contains a polishing target-derived glass component (polishing target particles) scraped off from the polishing target 3, fragments of the polishing cloth F, and the like together with the abrasive particles.

Hereinafter, a specific process in the polishing step will be described.

(1) Preparation of Abrasive Slurry

Abrasive particles are added to and dispersed in a solvent such as water so as to have a concentration of 0.5 to 40% by mass. An additive A having an ability to increase a polishing rate and an additive B having an ability to lower a polishing rate are further added thereto to prepare an unused abrasive slurry. This abrasive slurry is circulated and supplied to the polishing machine 1 to be used as illustrated in FIG. 1. As the abrasive particles, particles having an average particle diameter of several tens nm to several μm are used.

(2) Polishing

As illustrated in FIG. 1, while a polishing pad (polishing cloth F) is brought into contact with the polishing target 3 and the abrasive slurry 4 is supplied to the contact surface, the abrasive cloth F and the polishing target 3 are moved relatively to each other under pressure.

(3) Cleaning of Polishing Portion

A large number of abrasive particles adhere to the polishing target 3 and the polishing machine 1 immediately after polishing. Therefore, for example, pure water is supplied as the cleaning water 7 instead of the abrasive slurry after polishing, and the abrasive particles adhering to the polishing target 3 and the polishing machine 1 are cleaned. At this time, the cleaning liquid 10 containing the abrasive particles is discharged to the flow path 9.

By this cleaning operation, a certain amount of the abrasive particles is discharged to the flow path 9. Therefore, the amount of the abrasive particles in the system is reduced. In order to compensate for this decrease, a new abrasive slurry is added to the slurry tank $T_1$. As a timing for addition, addition may be performed each time one process is performed or each time a certain number of processes are performed.

[Abrasive Slurry Collection Step]

The abrasive slurry collection step is a step of collecting a used abrasive slurry.

The used abrasive slurry mainly includes the following two kinds of slurries. One is an abrasive slurry (rinse slurry) stored in the cleaning liquid storage tank $T_3$ together with cleaning water used in the cleaning operation. The other is an abrasive slurry (life end slurry) stored in the slurry tank $T_1$ and discarded after being used for a certain number of processes.

Therefore, in the abrasive slurry collection step, one or both of the rinse slurry and the life end slurry is collected.

Incidentally, the abrasive slurry collected (collected abrasive slurry) contains abrasive particles in an amount of approximately 0.1 to 20% by mass.

[Regeneration Step]

In the regeneration step, the collected abrasive slurry after the polishing target is polished is subjected to various processes to regenerate the collected abrasive slurry into an abrasive slurry (regenerated abrasive slurry) usable for polishing.

The regeneration step only needs to include at least an additive removal process for collecting an additive having a molecular weight of 500 or more and an additive adsorbed by abrasive particles among additives contained in the collected abrasive slurry together with the abrasive particles. In addition, the regeneration step preferably includes a foreign matter removal process, a polishing target dissolution process, a continuous filtration process, an abrasive concentration adjustment process, and the like as necessary. In the present invention, the abrasive concentration means the concentration (% by mass) of abrasive particles in an abrasive slurry.

In the regeneration step according to the present invention, various processes are performed while an abrasive concentration (% by mass) is maintained within a range of 0.2 to 3000% with respect to an abrasive concentration (% by mass) of an unused abrasive slurry when being used for polishing a polishing target. By maintaining the abrasive concentration at 0.2% or more, an excessive increase in the amount of a solvent in the collected abrasive slurry can be suppressed, the pH of the collected abrasive slurry can be set within a predetermined range, and hydrolysis of the additive A or the like can be suppressed. Therefore, desorption of the additive A adsorbed by the abrasive particles can be suppressed, and therefore the additive A can be efficiently collected. By maintaining the abrasive concentration at 3000% or less, the viscosity of the collected abrasive slurry can be maintained at a low value, and the amount of adhesion loss to an inside of a container, a device, or the like where the regeneration step is performed can be reduced.

Furthermore, the abrasive concentration is preferably maintained within a range of 1 to 3000%, more preferably within a range of 0.2 to 1000%, and particularly preferably within a range of 1 to 1000%.

Here, in the present invention, the abrasive concentration of an unused abrasive slurry when being used for polishing a polishing target means an abrasive concentration after an unused abrasive slurry is adjusted so as to have a concentration required for use thereof in the polishing step and means an abrasive concentration at the timing immediately before start of the polishing step. For example, in the example illustrated in FIG. 1, the abrasive concentration is an abrasive concentration at the timing immediately before the abrasive slurry stored in the slurry tank $T_1$ starts to be supplied from the slurry nozzle 5 onto the polishing surface plate 2, and the abrasive slurry does not contain those flowing into the slurry tank $T_1$ through the flow path 6.

The regeneration step according to the present invention will be described in detail with reference to FIGS. 2 and 3.

Figure 2:
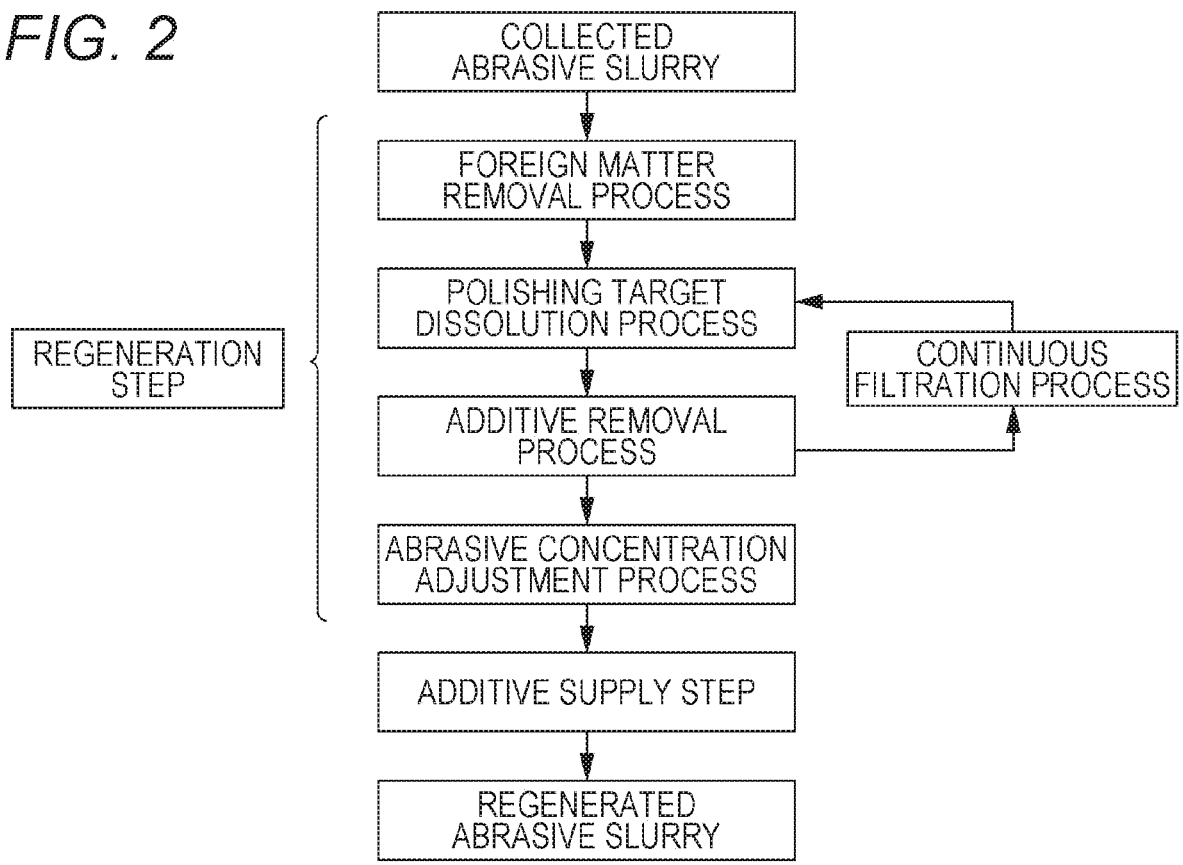
FIG. 2 is a schematic diagram exemplifying a step for obtaining a regenerated abrasive slurry from a collected abrasive slurry.

FIG. 2 is a schematic diagram exemplifying a step for obtaining a regenerated abrasive slurry from a collected abrasive slurry. FIG. 3 is a schematic configuration diagram illustrating a filter filtration device 20 used in the regeneration step according to the present invention.

(1. Foreign Matter Removal Process)

The collected abrasive slurry obtained in the abrasive slurry collection step includes the abrasive slurry used in the polishing step, cleaning water, fragments of a polishing cloth and ae polishing pad, and the like.

In the foreign matter removal process, foreign matters such as fragments of a polishing cloth and a polishing pad are removed using a filter having a pore diameter of 20 to 100 μm.

(2. Polishing Target Dissolution Process)

Subsequently, a polishing target dissolution process is performed. The polishing target dissolution process is a process for dissolving a polishing target contained in an abrasive slurry in a solvent such as water. As described above, the polishing target dissolution process is performed such that an abrasive concentration (% by mass) is maintained within a range of 0.2 to 3000% with respect to an abrasive concentration (% by mass) of an unused abrasive slurry when being used for polishing a polishing target.

Figure 3:
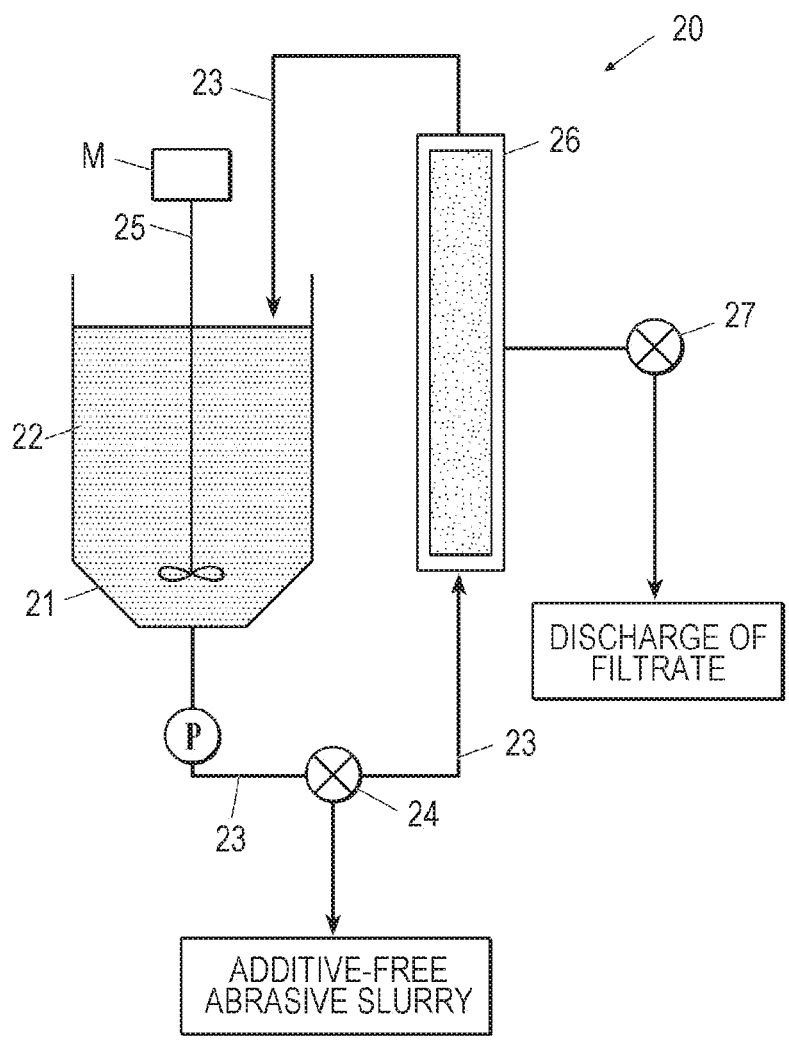
FIG. 3 is a schematic configuration diagram of a filter filtration device according to the present embodiment.

Specifically, for example, as illustrated in FIG. 3, a collected abrasive slurry 22 from which foreign matters have been removed by a foreign matter removal process is put in a tank 21 of a filter filtration device 20 equipped with a temperature control unit.

Subsequently, a solvent is added to the collected abrasive slurry 22 in the tank 21, and the resulting mixture is stirred with a stirrer 25 equipped with a motor M to dissolve a polishing target. The solvent to be added contains water as a main component.

The collected abrasive slurry is preferably heated in the tank 21, and particularly preferably heated to 40 to 90° C.

As described above, by adding a solvent and optionally performing heating, dissolution of a polishing target component progresses. Meanwhile, the abrasive particles are not dissolved in the solvent, and therefore separation can be performed with a filter in an additive removal process described later.

Incidentally, in the polishing target dissolution process, after the polishing target is dissolved, the collected abrasive slurry may be filtered separately from the additive removal process described later. As a result, a filtrate containing the polishing target and a part of the solvent may be separated from the collected abrasive slurry to remove the polishing target from the collected abrasive slurry.

(3. Additive Removal Process)

Subsequently, in order to remove an additive unnecessary for polishing, an additive removal process for filtering the collected abrasive slurry obtained by dissolving the polishing target component by the polishing target dissolution process using a filtration filter 26 is performed. As described above, the additive removal process is performed such that an abrasive concentration (% by mass) is maintained within a range of 0.2 to 3000% with respect to an abrasive concentration (% by mass) of an unused abrasive slurry when being used for polishing a polishing target.

Specifically, filtration is performed under such conditions that an additive having a molecular weight of 500 or more and an additive adsorbed by abrasive particles among additives contained in the collected abrasive slurry can be collected together with the abrasive particles. As a result, a filtrate containing an additive having a molecular weight of less than 500, a part of the solvent, and a polishing target component dissolved in a part of the solvent can be separated from the collected abrasive slurry. The filtrate separated from the collected abrasive slurry is discharged out of the system by opening an on-off valve 27.

The additive B mainly has a molecular weight of less than 500 and is hardly adsorbed by the abrasive particles. Therefore, most of the additive B is removed from the collected abrasive slurry by the additive removal process.

Meanwhile, the additive A mainly has a molecular weight of 500 or more, or most of the additive A is adsorbed by the abrasive particles. Therefore, the additive A is hardly removed by the additive removal process. In addition, a component of the additive A having an original molecular weight of 500 or more and having a molecular weight of less than 500 due to decomposition or the like is removed from the collected abrasive slurry by the additive removal process. However, when the component is, for example, decomposed, an ability to increase a polishing rate is reduced, and therefore the component is preferably removed from the collected abrasive slurry.

The filtration filter 26 is not particularly limited, and examples thereof include a hollow fiber filter, a metal filter, a wound filter, a ceramic filter, and a roll type polypropylene filter.

Preferable examples of the ceramic filter include a ceramic filter manufactured by TAMI, France, a ceramic filter manufactured by Noritake Co., Limited, and a ceramic filter manufactured by NGK Insulators, Ltd. (for example, Cerallec DPF or Cefilt).

Incidentally, it is also preferable to perform the additive removal process before performing the polishing target dissolution process, to separate the filtrate containing an additive having a molecular weight of less than 500 and a part of the solvent, and then to perform the polishing target dissolution process. By filtering the collected abrasive slurry after the polishing target dissolution process, for example, the polishing target can be removed efficiently.

In addition, the additive removal process is not limited to filtration as long as the additive having a molecular weight of 500 or more and the additive adsorbed by the abrasive particles can be collected together with the abrasive particles and may be centrifugal separation or the like.

(4. Continuous Filtration Process)

Subsequently, the same amount of water as the filtrate separated from the collected abrasive slurry in the additive removal process is added, and a continuous filtration process for repeating the operation of performing filtration again to remove an unnecessary additive and a polishing target is performed. In addition, the continuous filtration process is performed such that an abrasive concentration (% by mass) is maintained within a range of 0.2 to 3000% with respect to an abrasive concentration (% by mass) of an unused abrasive slurry when being used for polishing a polishing target.

Specifically, while the collected abrasive slurry is circulated through a circulation pipe 23, the polishing target dissolution process and the additive removal process are continuously performed over a predetermined period of time. At a stage when the concentration of the additive B in the collected abrasive slurry is lowered to a predetermined concentration, a three-way valve 24 is switched to a discharge side, and the additive-free abrasive slurry is discharged outside the system and collected. Note that the time and the number of times to perform the polishing target dissolution process and the additive removal process in the continuous filtration process only need to be appropriately set according to the configuration of the filter filtration device 20, the components of the collected abrasive slurry, and the like.

The concentration of the additive B in the additive-free abrasive slurry is preferably lowered by removal to a concentration as low as 0.2 to 50% with respect to the concentration of an unused abrasive slurry when being used for polishing a polishing target.

In the present invention, the content of each of the additives in the abrasive slurry can be quantified, for example, using a high-performance liquid chromatography (HPLC).

(5. Abrasive Concentration Adjustment Process)

Subsequently, an abrasive concentration adjustment process for adjusting an abrasive concentration on the additive-free abrasive slurry obtained through the continuous filtration process is performed In addition, as described above, the abrasive concentration adjustment process is performed such that an abrasive concentration (% by mass) is maintained within a range of 0.2 to 3000% with respect to an abrasive concentration (% by mass) of an unused abrasive slurry when being used for polishing a polishing target.

Specifically, the abrasive concentration is adjusted by performing concentration through filtration or the like or by performing dilution by adding water or the like.

In such a manner as described above, the regeneration step is performed.

[Additive Supply Step]

Subsequently, an additive supply step of setting the supply amount of the additive A to be supplied and supplying the set supply amount of additive may be performed on the additive-free abrasive slurry obtained in the regeneration step. The abrasive slurry regeneration method of the present invention can collect an additive necessary for the abrasive slurry together with the abrasive particles, and therefore the additive supply step may be performed as necessary.

Specifically, the electrical conductivity of the additive-free abrasive slurry is measured, a supply amount to be added is set according to the measured value, and the set supply amount of additive is added to the additive-free abrasive slurry. The supply amount of the additive A is preferably set to such a value that a value of the electric conductivity of an abrasive slurry finally obtained by regeneration is 0.05 to 100 times a value of the electric conductivity of an unused abrasive slurry when being used for polishing a polishing target.

The electric conductivity can be measured by adjusting the temperature of a sample liquid to 25° C., for example, using an electric conductivity meter (ES-51 manufactured by Horiba, Ltd.), an electric conductivity meter (CM-30G manufactured by DKK-TOA Corporation), a Lacom tester handy type conductivity meter Cyber Scan CON 110 (As One Corporation), or a compact electric conductivity meter LAQUA twin B-771 (manufactured by Horiba, Ltd.).

The supply amount of the additive A at this time is preferably set so as to have a concentration of 0.1 to 50 times the concentration of the additive A in an unused abrasive slurry when being used for polishing a polishing target.

For example, in a case where the abrasive concentration is 1.0% by mass and the concentration of the additive A is 0.02% by mass in an unused abrasive slurry when being used for polishing a polishing target, for a regenerated abrasive slurry, the supply amount of the additive A is preferably set such that the concentration of the additive A is 0.002 to 1.0% by mass if the abrasive concentration is 1.0% by mass.

<<Regeneration Flow of Abrasive Slurry and Input-Output Balance of Constituting Materials in Each Step>>

Figure 4:
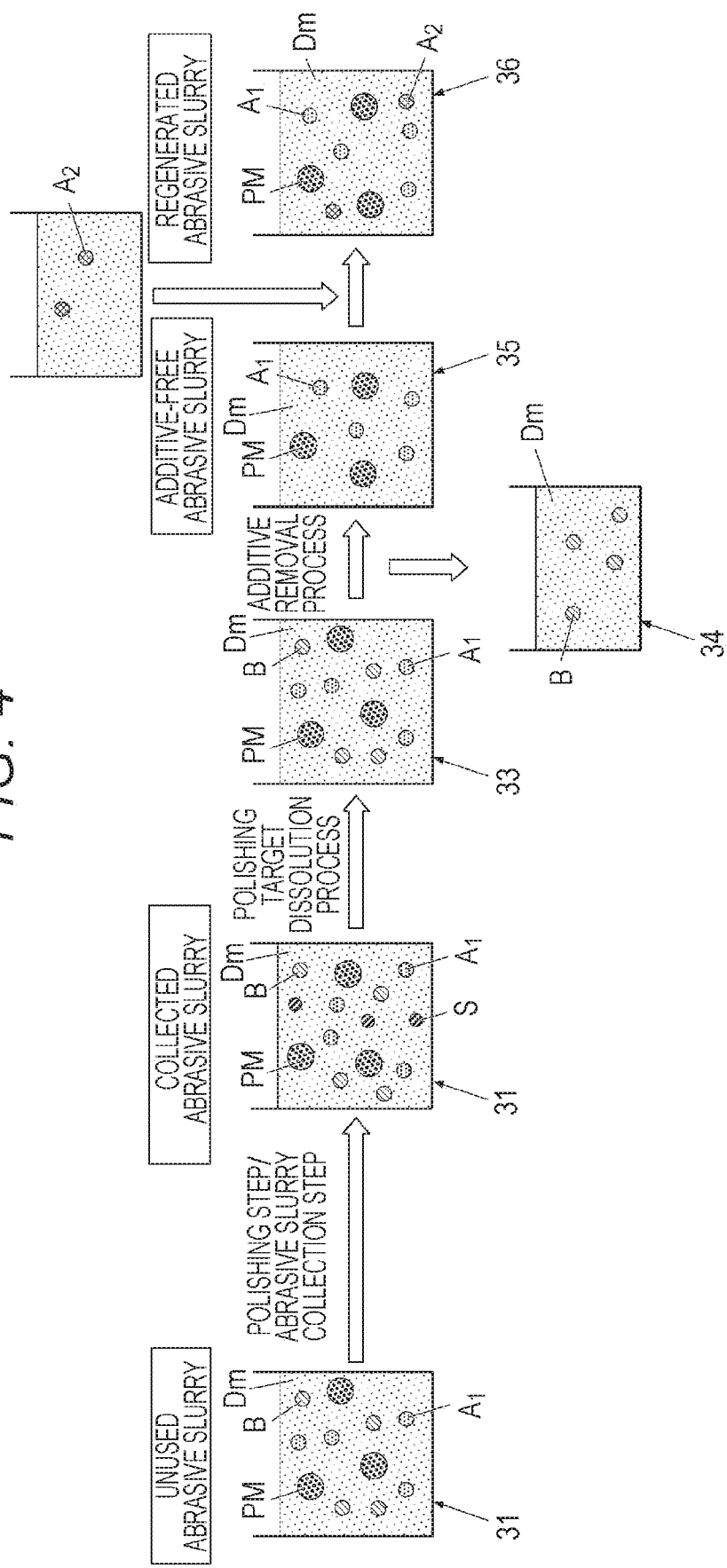
FIG. 4 is a schematic diagram illustrating constituent materials of an abrasive slurry at each stage from an unused abrasive slurry to obtaining a regenerated abrasive slurry.

FIG. 4 is a schematic diagram illustrating constituent materials of the abrasive slurry at each stage from an unused abrasive slurry to obtaining a regenerated abrasive slurry, describe above.

First, when being used for polishing a polishing target, an unused abrasive slurry 31 contains a liquid medium Dm (mainly water), abrasive particles (abrasive grains) PM as a main material, an additive $A_1$ having an ability to increase a polishing rate, and an additive B having an ability to lower a polishing rate. As the additive B, an antiseptic agent, an antibacterial agent, or the like for securing storage stability and the like in a period from preparation of the abrasive slurry to use thereof in the polishing step is used.

The polishing step is performed using this unused abrasive slurry 31, and then an abrasive slurry collection step is performed to collect a collected abrasive slurry 32. This collected abrasive slurry 32 contains, in addition to constituent materials of the unused abrasive slurry 31, a polishing target S which is a polished residue generated in the polishing step and the like.

The collected abrasive slurry 32 is subjected to the regeneration step. In the example illustrated in FIG. 4, the regeneration step includes the polishing target dissolution process and the additive removal process but may further include at least one of the foreign matter removal process, the continuous filtration process, and the abrasive concentration adjustment process. Incidentally, in the regeneration step, various processes are preferably performed such that an abrasive concentration (% by mass) is maintained within a range of 0.2 to 3000% with respect to an abrasive concentration (% by mass) of an unused abrasive slurry when being used for polishing a polishing target.

Subsequently, the polishing target S is dissolved by performing the polishing target dissolution process, and the collected abrasive slurry 33 in which the polishing target S is dissolved is subjected to the additive removal process using the filter filtration device 20 illustrated in FIG. 3. As described above, the additive removal process is performed under such conditions that an additive having a molecular weight of 500 or more and an additive adsorbed by abrasive particles can be collected together with the abrasive particles. As a result, a filtrate 34 containing the additive B is separated from the collected abrasive slurry 33, and the additive $A_1$ is collected together with the abrasive particles PM to obtain an additive-free abrasive slurry 35 as a regenerated abrasive slurry. At this time, the additive $A_1$ may be collected while being adsorbed by the abrasive particles PM or may be collected singly. Although not illustrated, a component of the additive $A_1$ having a molecular weight of less than 500 due to decomposition or the like is contained in the filtrate 34 together with the additive B.

Although not illustrated, the filtrate 34 may contain a slight amount of the additive $A_1$, and the additive-free abrasive slurry 35 may contain a slight amount of the additive B.

The additive-free abrasive slurry 35 has a high polishing rate because the content of the additive B is reduced, and the additive A remains in the additive-free abrasive slurry 35. Therefore, the step of supplying the additive A is not essential. Therefore, according to the abrasive slurry regeneration method of the present invention, an abrasive slurry having a high polishing rate can be efficiently regenerated.

Incidentally, although not essential, as illustrated in FIG. 4, the additive-free abrasive slurry 35 may be subjected to the additive supply step, and an additive-supplied abrasive slurry 36 thus obtained may be used as a regenerated abrasive slurry. In the additive supply step, the additive $A_2$ is preferably supplied such that the concentration of the additive A (containing the additives $A_1$ and $A_2$) is 10 to 5000% with respect to the concentration of the additive $A_1$ in the unused abrasive slurry 31 when being used for polishing a polishing target. Note that the additive $A_2$ may be the same as or different from the additive $A_1$.

<<Constituent Material of Abrasive Slurry>>

Next, main constituent materials of the abrasive slurry according to the present invention will be described in detail.

[Abrasive Particles]

In general, as an abrasive slurry used for polishing optical glass, a semiconductor substrate, and the like, for example, a slurry obtained by dispersing fine particles of red oxide ($\alpha Fe_2O_3$), cerium oxide, aluminum oxide, manganese oxide, zirconium oxide, or colloidal silica in water or oil is used.

The abrasive slurry regeneration method of the present invention is preferably applied to an abrasive slurry which can be applied to chemical mechanical polishing (CMP) for performing polishing with both a physical action and a chemical action in order to obtain a sufficient processing rate while maintaining planarity with high accuracy in polishing a surface of a semiconductor substrate or glass. The abrasive particles contained in the abrasive slurry are preferably selected from, for example, cerium oxide, diamond, boron nitride, silicon carbide, alumina, alumina zirconia, and zirconium oxide.

Examples of a diamond-based abrasive as the abrasive particles according to the present invention include synthetic diamond and natural diamond. A boron nitride-based abrasive has the second highest hardness after diamond, and examples thereof include cubic boron nitride BN (for example, manufactured by Showa Denko KK). Examples of a silicon carbide-based abrasive include silicon carbide, green silicon carbide, and black silicon carbide. Examples of an alumina based abrasive include, in addition to alumina, brown alumina, white alumina, rose-pink alumina, cracked alumina, and an alumina zirconia-based abrasive. Examples of the zirconium oxide include BR series zirconium oxide for abrasives manufactured by Daiichi Kigenso Kagaku Kogyo Co., Ltd.

Components and shapes of the abrasive particles used in the present invention are not particularly limited, and generally commercially available products as abrasive particles can be used.

As a method for dispersing the abrasive particles in water, in addition to a dispersing process with an ordinary stirrer, a method with a homogenizer, an ultrasonic dispersing machine, a wet type ball mill, or the like is possible. An average particle diameter of the abrasive particles in the abrasive slurry thus manufactured is preferably in a range of 0.01 to 1.0 μm. If the average particle diameter of the abrasive particles is 0.01 μm or more, a high polishing rate can be obtained. If the average particle diameter is 1.0 μm or less, generation of a scratch or the like on a surface of the polishing target during polishing can be prevented.

[Additive]

The additive contained in the abrasive slurry according to the present invention is roughly divided into the additive A having an ability to increase a polishing rate and the additive B having an ability to lower a polishing rate.

The "additive having an ability to increase a polishing rate" and "the additive having an ability to lower a polishing rate" as referred to in the present invention are defined as compounds satisfying conditions defined below.

First, using a reference abrasive slurry 1 in which only abrasive particles are dispersed in water at a concentration of 1.0% by mass, a polishing rate 1 is measured according to the following method.

Using a polishing machine illustrated in FIG. 1, a surface to be polished is polished with a polishing cloth while the abrasive slurry 1 is supplied to the surface to be polished. In a polishing test, the abrasive slurry 1 was circulated and supplied at a flow rate of 5 L/min for polishing. A glass substrate having a thickness of 65 mm was used as a polishing target, and a polishing cloth made of polyurethane was used. A pressure of 9.8 kPa (100 g/cm$^2$) was used during polishing a surface to be polished, a rotation speed of a polishing tester was set to 100 min$^{-1}$ (rpm), and polishing was performed for 30 minutes. The thicknesses before and after polishing were measured with Nikon Digimicro (MF 501). The polishing amount (μm) per minute was calculated from a thickness displacement and was taken as the polishing rate 1.

Subsequently, an abrasive slurry 2 to be measured, containing 0.02% by mass of the additive A or additive B to be measured and 1.0% by mass of abrasive particles, was prepared. A polishing rate 2 was measured in a similar manner to the above method.

Subsequently, a polishing rate ratio (polishing rate 2/polishing rate 1) was determined from the obtained polishing rates. If the polishing rate ratio is less than 1.00, the additive is defined as an additive having an ability to lower a polishing rate. If the polishing rate ratio is 1.02 or more, the additive is defined as an additive having an ability to increase a polishing rate. The additive having an ability to increase a polishing rate preferably has a polishing rate ratio of 1.05 or more, more preferably of 1.10 or more.

[Additive A: Additive Having Ability to Increase Polishing Rate]

The additive A applicable to the present invention has a function of increasing a polishing efficiency, and main examples thereof include:

(1) a dispersant for improving dispersion stability of abrasive particles;

(2) an $SiO_2/Si_3N_4$ film selection ratio improver for improving a polishing rate of an $SiO_2$ film with respect to a polishing rate of an $Si_3N_4$ film; and (3) a cleaning agent having an effect of improving cleaning performance.

Hereinafter, representative compounds of the additive A applicable to the present invention are listed, but the additive A is not limited only to the compounds exemplified here.

(Dispersant)

Examples of the dispersant include a water-soluble anionic dispersant, a water-soluble cationic dispersant, a water-soluble nonionic dispersant, and a water-soluble amphoteric (betaine) dispersant. A dispersant which is a polymer compound containing an ammonium acrylate as a copolymerization component is preferable. Examples thereof include ammonium polyacrylate and a copolymer of acrylic acid amide and ammonium acrylate.

In the abrasive slurry according to the present invention, two or more of the above dispersants may be used in combination. For example, at least one polymer dispersant containing an ammonium acrylate as a copolymerization component and at least one dispersant selected from a water-soluble anionic dispersant, a water-soluble nonionic dispersant, a water-soluble cationic dispersant, and a water-soluble amphoteric dispersant may be used in combination.

In a case where the abrasive slurry is used for polishing in manufacturing a semiconductor element, the content of an alkali metal such as a sodium ion or a potassium ion in the dispersant is preferably suppressed to 10 ppm or less.

The addition amount of the dispersant is preferably 0.01 to 2.0 parts by mass with respect to 100 parts by mass of cerium oxide particles, for example, in a case where abrasive particles are formed of cerium oxide from viewpoints of dispersibility of the abrasive particles in the abrasive slurry, prevention of sedimentation, and a relationship between a polishing scratch and the addition amount of the dispersant. The dispersant has a molecular weight preferably of 500 to 50,000, more preferably of 1,000 to 10,000. If the molecular weight of the dispersant is 500 or more, a sufficient polishing rate can be obtained when a silicon oxide film or a silicon nitride film as a polishing target is polished. If the molecular weight of the dispersant is 50,000 or less, an increase in viscosity of the abrasive slurry can be suppressed, and storage stability can be secured. Incidentally, in a case where the dispersant is a polymer having a molecular weight of 10,000 or more, the above preferable molecular weight of the dispersant is a weight average molecular weight.

<Anionic Dispersant>

Examples of the anionic dispersant include triethanolamine lauryl sulfate, ammonium lauryl sulfate, triethanolamine polyoxyethylene alkyl ether sulfate, and a polycarboxylic acid type polymer dispersant.

Examples of the polycarboxylic acid type polymer dispersant include a polymer of a carboxylic acid monomer having an unsaturated double bond, such as acrylic acid, methacrylic acid, maleic acid, fumaric acid, or itaconic acid, a copolymer of a carboxylic acid monomer having an unsaturated double bond and a monomer having another unsaturated double bond, and ammonium salts and amine salts thereof.

<Cationic Dispersant>

Examples of the cationic dispersant include primary to tertiary aliphatic amines, tetraalkylammonium, trialkylbenzylammonium alkylpyridinium, 2-alkyl-1-alkyl-1-hydroxyethylimidazolinium, N,N-dialkyl morpholinium, polyethylene polyamine fatty acid amide, a urea condensate of polyethylene polyamine fatty acid amide, quaternary ammonium of a urea condensate of polyethylene polyamine fatty acid amide, and salts thereof.

<Nonionic Dispersant>

Examples of the nonionic dispersant include polyoxyethylene lauryl ether, polyoxyethylene cetyl ether, polyoxyethylene stearyl ether, polyoxyethylene oleyl ether, polyoxyethylene higher alcohol ether, polyoxyethylene octyl phenyl ether, polyoxyethylene nonylphenyl ether, polyoxyalkylene alkyl ether, a polyoxyethylene derivative, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, polyoxyethylene sorbitol tetraoleate, polyethylene glycol monolaurate, polyethylene glycol monostearate, polyethylene glycol distearate, polyethylene glycol monooleate, polyoxyethylene alkylamine, polyoxyethylene hydrogenated castor oil, 2-hydroxyethyl methacrylate, and alkyl alkanol amide.

<Betaine Dispersant>

Examples of the betaine dispersant include: a betaine such as N,N-dimethyl-N-alkyl-N-carboxymethylammonium betaine, N,N,N-trialkyl-N-sulfoalkyleneammonium betaine, N,N-dialkyl-N,N-bispolyoxyethylene ammonium sulfate betaine, or 2-alkyl-1-carboxymethyl-1-hydroxyethylimidazolinium betaine; and an aminocarboxylic acid such as N,N-dialkylaminoalkylenecarboxylate.

(Polishing Rate Selection Ratio Improver)

In the abrasive slurry according to the present invention, in a case where the polishing target contains silicon nitride, a polishing rate selection ratio improver can be used as the additive A.

Improvement of a polishing rate selection ratio as referred to in the present invention means improvement of a polishing rate ratio (hereinafter, also referred to as a selection ratio) of a silicon nitride film ($Si_3N_4$) to a polishing rate of a silicon oxide film ($SiO_2$).

In the present invention, the polishing rate selection ratio improver is preferably an organic cationic compound from a viewpoint of improving a ratio of a polishing rate of a silicon nitride film to a polishing rate of a silicon oxide film.

The organic cationic compound preferably contains a nitrogen atom, and more preferably contains an amino group or a quaternary ammonium group. The organic cationic compound has a molecular weight preferably of 500 to 50,000, more preferably of 1,000 to 10,000 from a viewpoint of water-solubility.

The compound having an amino group only needs to have one or more amino groups in one molecule. The number of the amino groups is preferably 1 to 20, more preferably 1 to 10, still more preferably 1 to 5, and most preferably 1 to 3 from a viewpoint of water-solubility. A ratio (C/N ratio) of the number of carbon atoms and the number of nitrogen atoms contained in one molecule of the compound having an amino group is preferably 1 to 20, more preferably 1 to 10, still more preferably 1 to 6, and most preferably 1 to 4 from a viewpoint of water-solubility. However, an ethanolamine-based compound is excluded.

Specific examples of a compound for the polishing rate selection ratio improver include a monoamine such as a primary amine, a secondary amine, or a tertiary amine, a polyamine, an amine having an OH group, an amine having an ether group, a heterocyclic compound containing a nitrogen atom, and a compound having a quaternary ammonium group, described in JP 2002-114967 A, JP 2002-118082 A, JP 2002-201462 A, JP 2004-269577 A, and JP 2004-273547 A.

Among these compounds, ethylamine, propylamine, isopropylamine, butylamine, and ethylenediamine are particularly preferable.

(Cleaning Agent)

In the present invention, a cleaning agent is preferably used as one of the additives A, and an alcohol-based compound is particularly preferably used as the cleaning agent.

Examples of the alcohol-based compound which is a cleaning agent applicable to the present invention include: an alcohol such as 1-propanol, 2-propanol, 2-propyn-1-ol, allyl alcohol, ethylene cyanohydrin, 1-butanol, 2-butanol, (S)-(+)-2-butanol, 2-methyl-1-propanol, t-butyl alcohol, perfluoro-t-butyl alcohol, crotyl alcohol, 1-pentanol, 2,2-dimethyl-1-propanol, 2-methyl-2-butanol, 3-methyl-1-butanol, S-amyl alcohol, 1-hexanol, 4-hydroxy-4-methyl-2-pentanone, 4-methyl-2-pentanol, cyclohexanol, DL-3-hexyl alcohol, 1-heptanol, 2-ethylhexyl alcohol, (S)-(+)-2-octanol, 1-octanol, DL-3-octyl alcohol, 2-hydroxybenzyl alcohol, 2-nitrobenzyl alcohol, 3,5-dihydroxybenzyl alcohol, 3,5-dinitrobenzyl alcohol, 3-fluorobenzyl alcohol, 3-hydroxybenzyl alcohol, 4-fluorobenzyl alcohol, 4-hydroxybenzyl alcohol, benzyl alcohol, m-(trifluoromethyl) benzyl alcohol, m-aminobenzyl alcohol, m-nitrobenzyl alcohol, o-aminobenzyl alcohol, o-hydroxybenzyl alcohol, p-hydroxybenzyl alcohol, p-nitrobenzyl alcohol, 2-(p-fluorophenyl) ethanol, 2-aminophenethyl alcohol, 2-methoxybenzyl alcohol, 2-methyl-3-nitrobenzyl alcohol, 2-methylbenzyl alcohol, 2-nitrophenethyl alcohol, 2-phenylethanol, 3,4-dimethylbenzyl alcohol, 3-methyl-2-nitrobenzyl alcohol, 3-methyl-4-nitrobenzyl alcohol, 3-methylbenzyl alcohol, 4-fluorophenethyl alcohol, 4-hydroxy-3-methoxybenzyl alcohol, 4-methoxybenzyl alcohol, 4-methyl-3-nitrobenzyl alcohol, 5-methyl-2-nitrobenzyl alcohol, DL-α-hydroxyethylbenzene, o-(trifluoromethyl) benzyl alcohol, p-(trifluoromethyl) benzyl alcohol, p-aminophenethyl alcohol, p-hydroxyphenyl ethanol, p-methylbenzyl alcohol, or S-phenethyl alcohol; and a phenol such as 4-methylphenol, 4-ethylphenol, or 4-propylphenol. Among these compounds, a compound having a molecular weight of less than 500 is adsorbed by the abrasive particles due to a hydrophobic group such as an alkyl group in the abrasive slurry, and therefore can be collected together with the abrasive particles in the regeneration step.

[Additive B: Additive Having Ability to Lower Polishing Rate]

As described above, the additive B is an additive for imparting storage stability and the like in a period from preparation of the abrasive slurry to use thereof in the polishing step and has an ability to lower the polishing rate. Therefore, the additive B is an unnecessary component because the regenerated abrasive slurry is often used immediately after regeneration.

Main examples of a compound corresponding to the additive B include an antiseptic agent, an antibacterial agent, and a rust inhibitor.

(Antiseptic Agent)

Examples of the antiseptic include benzalkonium chloride, benzethonium chloride, 1,2-benzisothiazolin-3-one, (5-chloro) 2-methyl-4-isothiazolin-3-one, hydrogen peroxide, and hypochlorous acid.

(Antibacterial Agent)

Examples of the antibacterial agent include a quaternary ammonium type antibacterial agent. Examples thereof include tetramethylammonium chloride, tetraethylammonium chloride, tetramethylammonium hydroxide, and tetraethylammonium hydroxide.

(Rust Inhibitor)

Examples of the rust inhibitor include an ethanolamine-based compound such as N,N-diethylethanolamine, N,N-dimethylethanolamine, or aminoethylethanolamine.

Examples

Hereinafter, the present invention will be specifically described with reference to Examples, but the present invention is not limited thereto. Note that an expression "%" used in Examples means "% by mass" unless otherwise specified.

<<Preparation of Regenerated Abrasive Slurry 101>>

(Preparation of Unused Abrasive Slurry)

The following abrasive particles and additives were added to pure water and dispersed therein using a homogenizer to prepare 10 kg of an abrasive slurry having a $CeO_2$ concentration (abrasive concentration) of 4000 ppm by mass. This abrasive slurry was used as an unused abrasive slurry. The $CeO_2$ concentration was measured by ICP emission spectroscopic analysis (inductively coupled plasma emission spectroscopic analysis). Hereinafter, the $CeO_2$ concentration was measured similarly.

Abrasive particles: cerium oxide abrasive 40.0 g

Additive A: polyacrylic acid ammonium salt (PAA, dispersant, molecular weight: 8000) 0.6 g Additive A: 2-ethylhexanol (cleaning agent, molecular weight: 130) 0.2 g Additive B: hypochlorous acid (antiseptic agent, molecular weight: 52) 0.1 g (Polishing Step)

Using a polishing machine illustrated in FIG. 1, a surface to be polished was polished with a polishing cloth while the unused abrasive slurry prepared above was supplied to the surface to be polished. The abrasive slurry was circulated and supplied at a flow rate of 5 L/min for polishing. A glass substrate of 65 mmΦ was used as a polishing target, and a polishing cloth made of polyurethane was used. A pressure of 9.8 kPa (100 g/cm$^2$) was used during polishing a surface to be polished, a rotation speed of a polishing tester was set to 100 min$^{-1}$ (rpm), and polishing was performed for 30 minutes. The thicknesses before and after polishing were measured with Nikon Digimicro (MF 501). The polishing amount (μm) per minute was calculated from a thickness displacement, and a polishing rate (μm/min) was measured and assumed to be 1.00. Pure water was used as cleaning water for cleaning a polishing portion.

(Abrasive Slurry Collection Step)

The abrasive slurry used in the polishing step was collected together with the cleaning water and was used as a collected abrasive slurry. The collected abrasive slurry had a $CeO_2$ concentration of 950 ppm by mass and had a collection amount of 20 kg.

(Regeneration Step: Foreign Matter Removal Process)

The collected abrasive slurry was subjected to a foreign matter removal process using a hollow fiber filter having a pore diameter of 45 µm.

(Regeneration Step: Polishing Target Dissolution Process)

The collected abrasive slurry from which foreign matters had been removed by the foreign matter removal process was put in a tank equipped with a stirrer, and pure water was added as a solvent to the tank to adjust the $CeO_2$ concentration to 12 ppm by mass.

(Regeneration Step: Additive Removal Process)

Subsequently, 3166 L of pure water was removed by filtering the collected abrasive slurry which had been stirred using a filtration filter (ceramic filter manufactured by Noritake Co., Limited, pore diameter: 0.2 µm) at a filtrate flow rate of 200 L/h for 16.63 hours to obtain 0.27 kg of an additive-free abrasive slurry having a $CeO_2$ concentration of 107018 ppm by mass. This abrasive slurry was used as a regenerated abrasive slurry 101. A collection ratio of the abrasive particles was 75% before and after the additive removal process.

<<Preparation of Regenerated Abrasive Slurry 102>>

A regenerated abrasive slurry 102 was prepared in a similar manner to the preparation of the regenerated abrasive slurry 101 except that pure water was added such that the $CeO_2$ concentration was 40 ppm by mass in the polishing target dissolution process and that 949 L of pure water was removed by setting the filtering time to 4.99 hours in the additive removal process. Table 1 illustrates the composition of the obtained regenerated abrasive slurry 102.

<<Preparation of Regenerated Abrasive Slurry 103>>

A regenerated abrasive slurry 103 was prepared in a similar manner to the preparation of the regenerated abrasive slurry 101 except that pure water was added such that the $CeO_2$ concentration was 400 ppm by mass in the polishing target dissolution process and that 94 L of pure water was removed by setting the filtering time to 0.5 hours in the additive removal process. Table 1 illustrates the composition of the obtained regenerated abrasive slurry 103.

<<Preparation of Regenerated Abrasive Slurry 104>>

A regenerated abrasive slurry 104 was prepared in a similar manner to the preparation of the regenerated abrasive slurry 101 except that pure water was added such that the $CeO_2$ concentration was 12 ppm by mass in the polishing target dissolution process and that 3165 L of pure water was removed by setting the filtering time to 16.63 hours in the additive removal process. Table 1 illustrates the composition of the obtained regenerated abrasive slurry 104.

<<Preparation of Regenerated Abrasive Slurry 105>>

A regenerated abrasive slurry 105 was prepared in a similar manner to the preparation of the regenerated abrasive slurry 101 except that pure water was added such that the $CeO_2$ concentration was 40 ppm by mass in the polishing target dissolution process and that 949 L of pure water was removed by setting the filtering time to 4.99 hours in the additive removal process. Table 1 illustrates the composition of the obtained regenerated abrasive slurry 105.

<<Preparation of Regenerated Abrasive Slurry 106>>

A regenerated abrasive slurry 106 was prepared in a similar manner to the preparation of the regenerated abrasive slurry 101 except that pure water was added such that the $CeO_2$ concentration was 400 ppm by mass in the polishing target dissolution process and that 94 L of pure water was removed by setting the filtering time to 0.49 hours in the additive removal process. Table 1 illustrates the composition of the obtained regenerated abrasive slurry 106.

<<Preparation of Regenerated Abrasive Slurry 107>>

A regenerated abrasive slurry 107 was prepared in a similar manner to the preparation of the regenerated abrasive slurry 101 except that pure water was added such that the $CeO_2$ concentration was 12 ppm by mass in the polishing target dissolution process and that 3166 L of pure water was removed by setting the filtering time to 16.63 hours in the additive removal process. Table 1 illustrates the composition of the obtained regenerated abrasive slurry 107.

<<Preparation of Regenerated Abrasive Slurry 108>>

A regenerated abrasive slurry 108 was prepared in a similar manner to the preparation of the regenerated abrasive slurry 101 except that pure water was added such that the $CeO_2$ concentration was 40 ppm by mass in the polishing target dissolution process and that 949 L of pure water was removed by setting the filtering time to 4.99 hours in the additive removal process. Table 1 illustrates the composition of the obtained regenerated abrasive slurry 108.

<<Preparation of Regenerated Abrasive Slurry 109>>

A regenerated abrasive slurry 109 was prepared in a similar manner to the preparation of the regenerated abrasive slurry 101 except that pure water was added such that the $CeO_2$ concentration was 400 ppm by mass in the polishing target dissolution process and that 94 L of pure water was removed by setting the filtering time to 0.5 hours in the additive removal process. Table 1 illustrates the composition of the obtained regenerated abrasive slurry 109.

<<Preparation of Regenerated Abrasive Slurry 110>>

A regenerated abrasive slurry 110 was prepared in a similar manner to the preparation of the regenerated abrasive slurry 101 except that pure water was added such that the $CeO_2$ concentration was 12 ppm by mass in the polishing target dissolution process and that 3157 L of pure water was removed by setting the filtering time to 16.59 hours in the additive removal process. Table 1 illustrates the composition of the obtained regenerated abrasive slurry 110.

<<Preparation of Regenerated Abrasive Slurry 111>>

A regenerated abrasive slurry 111 was prepared in a similar manner to the preparation of the regenerated abrasive slurry 101 except that pure water was added such that the $CeO_2$ concentration was 40 ppm by mass in the polishing target dissolution process and that 941 L of pure water was removed by setting the filtering time to 4.95 hours in the additive removal process. The composition of the regenerated abrasive slurry 111 obtained is illustrated in Table 1.

<<Preparation of Regenerated Abrasive Slurry 112>>

A regenerated abrasive slurry 112 was prepared in a similar manner to the preparation of the regenerated abrasive slurry 101 except that pure water was added such that the $CeO_2$ concentration was 400 ppm by mass in the polishing target dissolution process and that 86 L of pure water was removed by setting the filtering time to 0.45 hours in the additive removal process. Table 1 illustrates the composition of the obtained regenerated abrasive slurry 112.

<<Preparation of Regenerated Abrasive Slurry 113>>

A regenerated abrasive slurry 113 was prepared in a similar manner to the preparation of the regenerated abrasive slurry 101 except that pure water was added such that the $CeO_2$ concentration was 12 ppm by mass in the polishing target dissolution process and that 3166 L of pure water was removed by setting the filtering time to 16.63 hours in the additive removal process. Table 1 illustrates the composition of the obtained regenerated abrasive slurry 113.

<<Preparation of Regenerated Abrasive Slurry 114>>

A regenerated abrasive slurry 114 was prepared in a similar manner to the preparation of the regenerated abrasive slurry 101 except that pure water was added such that the $CeO_2$ concentration was 40 ppm by mass in the polishing target dissolution process and that 950 L of pure water was removed by setting the filtering time to 4.99 hours in the additive removal process. Table 1 illustrates the composition of the obtained regenerated abrasive slurry 114.

<<Preparation of Regenerated Abrasive Slurry 115>>

A regenerated abrasive slurry 115 was prepared in a similar manner to the preparation of the regenerated abrasive slurry 101 except that pure water was added such that the $CeO_2$ concentration was 400 ppm by mass in the polishing target dissolution process and that 95 L of pure water was removed by setting the filtering time to 0.5 hours in the additive removal process. Table 1 illustrates the composition of the obtained regenerated abrasive slurry 115.

<<Preparation of Regenerated Abrasive Slurry 116>>

A regenerated abrasive slurry 116 was prepared in a similar manner to the preparation of the regenerated abrasive slurry 101 except that pure water was added such that the $CeO_2$ concentration was 4 ppm by mass in the polishing target dissolution process and that 9499 L of pure water was removed by setting the filtering time to 49.9 hours in the additive removal process. Table 1 illustrates the composition of the obtained regenerated abrasive slurry 116.

TABLE 1

| Regenerated abrasive slurry No. | *1 Additive removal process Before process [%] | *1 Additive removal process After process [%] | Composition before additive removal process Pure water [kg] | $CeO_2$ Content [mg] | $CeO_2$ Concentration [ppm by mass] | PAA [mg] | *2 [mg] | Hypochlorous acid [mg] | $SiO_2$ [mg] | Total [kg] |
|---|---|---|---|---|---|---|---|---|---|---|
| 101 | 0.3 | 3000 | 3166 | 38000 | 12 | 570 | 180 | 90 | 120 | 3167 |
| 102 | 1.0 | 3000 | 950 | 38000 | 40 | 570 | 180 | 90 | 120 | 950 |
| 103 | 10.0 | 3000 | 95 | 38000 | 400 | 570 | 180 | 90 | 120 | 95 |
| 104 | 0.3 | 950 | 3166 | 38000 | 12 | 570 | 180 | 90 | 120 | 3167 |
| 105 | 1.0 | 950 | 950 | 38000 | 40 | 570 | 180 | 90 | 120 | 950 |
| 106 | 10.0 | 950 | 95 | 38000 | 400 | 570 | 180 | 90 | 120 | 95 |
| 107 | 0.3 | 1500 | 3166 | 38000 | 12 | 570 | 180 | 90 | 120 | 3167 |
| 108 | 1.0 | 1500 | 950 | 38000 | 40 | 570 | 180 | 90 | 120 | 950 |
| 109 | 10.0 | 1500 | 95 | 38000 | 400 | 570 | 180 | 90 | 120 | 95 |
| 110 | 0.3 | 100 | 3166 | 38000 | 12 | 570 | 180 | 90 | 120 | 3167 |
| 111 | 1.0 | 100 | 950 | 38000 | 40 | 570 | 180 | 90 | 120 | 950 |
| 112 | 10.0 | 100 | 95 | 38000 | 400 | 570 | 180 | 90 | 120 | 95 |
| 113 | 0.3 | 4500 | 3166 | 38000 | 12 | 570 | 180 | 90 | 120 | 3167 |
| 114 | 1.0 | 4500 | 950 | 38000 | 40 | 570 | 180 | 90 | 120 | 950 |
| 115 | 10.0 | 4500 | 95 | 38000 | 400 | 570 | 180 | 90 | 120 | 95 |
| 116 | 0.1 | 950 | 9500 | 38000 | 4 | 570 | 180 | 90 | 120 | 9500 |

| Regenerated abrasive slurry No. | Composition after additive removal process Pure water [kg] | $CeO_2$ Content [mg] | $CeO_2$ Concentration [ppm by mass] | PAA [mg] | *2 [mg] | Hypochlorous acid [mg] | $SiO_2$ [mg] | Total [kg] | Note |
|---|---|---|---|---|---|---|---|---|---|
| 101 | 0.2663 | 28500 | 107018 | 257 | 54 | 0.20 | 0.02 | 0.27 | Present invention |
| 102 | 0.2665 | 28500 | 106941 | 406 | 95 | 0.68 | 0.08 | 0.27 | Present invention |
| 103 | 0.2665 | 28500 | 106933 | 419 | 95 | 6.75 | 0.79 | 0.27 | Present invention |
| 104 | 0.9865 | 36100 | 36594 | 325 | 68 | 0.26 | 0.05 | 0.99 | Present invention |
| 105 | 0.9867 | 36100 | 36585 | 514 | 120 | 0.86 | 0.17 | 0.99 | Present invention |
| 106 | 0.9868 | 36100 | 36584 | 531 | 120 | 8.55 | 1.69 | 0.99 | Present invention |
| 107 | 0.5374 | 30400 | 56569 | 274 | 58 | 0.22 | 0.03 | 0.54 | Present invention |
| 108 | 0.5376 | 30400 | 56547 | 433 | 101 | 0.72 | 0.11 | 0.54 | Present invention |
| 109 | 0.5376 | 30400 | 56545 | 447 | 101 | 7.20 | 1.13 | 0.54 | Present invention |
| 110 | 9.0615 | 36100 | 3984 | 325 | 68 | 0.26 | 0.36 | 9.06 | Present invention |
| 111 | 9.0617 | 36100 | 3984 | 514 | 120 | 0.86 | 1.19 | 9.06 | Present invention |
| 112 | 9.0618 | 36100 | 3984 | 531 | 120 | 8.55 | 11.89 | 9.06 | Present invention |
| 113 | 0.0998 | 15200 | 152289 | 137 | 29 | 0.11 | 0.02 | 0.10 | Comparative Example |
| 114 | 0.0999 | 15200 | 152134 | 217 | 50 | 0.36 | 0.06 | 0.10 | Comparative Example |
| 115 | 0.0999 | 15200 | 152118 | 223 | 50 | 3.60 | 0.60 | 0.10 | Comparative Example |
| 116 | 0.9863 | 36100 | 36601 | 162 | 51 | 0.09 | 0.02 | 0.99 | Comparative Example |

*1: Concentration ratio of $CeO_2$ to unused abrasive slurry
*2: 2-Ethylhexanol

<<Evaluation of Regenerated Abrasive Slurries 101 to 116>>

The regenerated abrasive slurries prepared above were evaluated as follows. Table 2 illustrates evaluation results.

(1) Quantification of Components Contained in Abrasive Slurry Before and after Additive Removal Process Each component of pure water, $CeO_2$, PAA, 2-ethylhexanol, hypochlorous acid, and $SiO_2$ (polishing target) in each of the collected abrasive slurry before the additive removal process and the regenerated abrasive slurry obtained after the additive removal process was quantified using a high-performance liquid chromatography (HPLC) manufactured by Shimadzu Corporation. A collection ratio of the abrasive particles ($CeO_2$) was calculated before and after the additive removal process.

(2) Evaluation of Polishing Rate

Using each of the regenerated abrasive slurries thus prepared, a similar operation to the polishing step using the unused abrasive slurry was performed, and a polishing rate (μm/min) was measured. Based on the obtained polishing rate, a relative value was determined when the polishing rate was assumed to be 1.00 in a case where the polishing step was performed using the unused abrasive slurry, and evaluation was made according to the following criteria.

◯: 0.9 or more
Δ: 0.5 or more and less than 0.9
X: less than 0.5

(3) Measurement of the Number of Defects

Using each of the regenerated abrasive slurries thus prepared, a similar operation to the polishing step using the unused abrasive slurry was performed. Thereafter, a surface of a polishing target was observed in detail under a light source of a mercury lamp using an appearance inspection apparatus (Olympus AL 2000, Olympus Ltd.). The number of irregularities having a length of 0.2 to 1.0 μm was measured, and this number was taken as the number of defects. The number of defects per unit area was calculated from the area of a range where the number of defects was measured on the surface of the polishing target. Table 2 illustrates values thereof.

TABLE 2

| Regenerated abrasive slurry No. | $CeO_2$ collection ratio [%] | Polishing rate | Number of defects [piece/cm²] | Note |
| --- | --- | --- | --- | --- |
| 101 | 75 | ◯ | 0.05 | Present invention |
| 102 | 75 | ◯ | 0.01 | Present invention |
| 103 | 75 | ◯ | 0.01 | Present invention |
| 104 | 95 | ◯ | 0.05 | Present invention |
| 105 | 95 | ◯ | 0.01 | Present invention |
| 106 | 95 | ◯ | 0.01 | Present invention |
| 107 | 80 | ◯ | 0.05 | Present invention |
| 108 | 80 | ◯ | 0.01 | Present invention |
| 109 | 80 | ◯ | 0.01 | Present invention |
| 110 | 95 | ◯ | 0.05 | Present invention |
| 111 | 95 | ◯ | 0.01 | Present invention |
| 112 | 95 | ◯ | 0.01 | Present invention |
| 113 | 40 | ◯ | 0.05 | Comparative Example |
| 114 | 40 | ◯ | 0.01 | Comparative Example |
| 115 | 40 | ◯ | 0.01 | Comparative Example |
| 116 | 95 | X | 0.50 | Comparative Example |

As is clear from Tables 1 and 2, the regenerated abrasive slurry of the present invention obtained by performing the regeneration step of collecting the additive having a molecular weight of 500 or more and the additive adsorbed by the abrasive particles while the abrasive concentration is maintained within a range of 0.2 to 3000% with respect to the abrasive concentration of the unused abrasive slurry when being used for polishing a polishing target has a higher collection ratio of the abrasive particles ($CeO_2$), a better polishing rate, and the lower number of defects than the abrasive slurry in Comparative Example. Therefore, according to the abrasive slurry regeneration method of the present invention, an abrasive slurry having a high polishing rate can be efficiently regenerated.

In the regenerated abrasive slurries 113 to 115 in Comparative Example, the abrasive concentration in the regeneration step with respect to the abrasive concentration of the unused abrasive slurry was more than 3000%. As a result, loss of the collected abrasive slurry was increased, and the collection ratio of the abrasive particles was a low value. In the regenerated abrasive slurry 116 in Comparative Example, the abrasive concentration in the regeneration step with respect to the abrasive concentration of the unused abrasive slurry was less than 0.2%. As a result, the collection amount of the additive A was reduced, and the collection rate was a low value.

INDUSTRIAL APPLICABILITY

As described above, the present invention is suitable for providing an abrasive slurry regeneration method capable of efficiently regenerating an abrasive slurry having a high polishing rate.

REFERENCE SIGNS LIST

1 Polishing machine
2 Polishing surface plate
3 Polishing target
4 Abrasive slurry
5 Slurry nozzle
6 Flow path
7 Cleaning water
8 Cleaning water injection nozzle
9 Flow path
10 Cleaning liquid
20 Filter filtration device
21 Tank
22 Collected abrasive slurry
23 Circulation pipe
24 Three-way valve
25 Stirrer
26 Filtration filter
27 On-off valve
D1, D2 Pump
F Polishing cloth
M Motor
H Holder
$T_1$ Slurry tank
$T_2$ Cleaning water storage tank
$T_3$ Cleaning liquid storage tank

The invention claimed is:

1. An abrasive slurry regeneration method comprising:
    collecting a used abrasive slurry that has been used for polishing a polishing target, the polishing target containing silicon oxide as a main component, a collected used abrasive slurry comprising abrasive particles and a plurality of kinds of additives including a first additive having a molecular weight of 500 or more, the first additive being adsorbed on the abrasive particles;
    regenerating the collected used abrasive slurry to obtain a regenerated abrasive slurry; and maintaining an abrasive concentration during the regenerating within a range of 0.2 to 3000% mass % with respect to an abrasive concentration of an unused abrasive slurry used for polishing the polishing target, wherein the regenerating includes a polishing target dissolution process of dissolving a polishing target contained in the collected used abrasive slurry by adding a solvent to the collected used abrasive slurry, and the solvent does not contain an electrolyte.

2. The abrasive slurry regeneration method according to claim 1, wherein the abrasive concentration is maintained within a range of 1 to 3000% mass % with respect to the abrasive concentration of the unused abrasive slurry when being used for polishing the polishing target.

3. The abrasive slurry regeneration method according to claim 1, wherein the abrasive concentration is maintained within a range of 0.2 to 1000% mass % with respect to the abrasive concentration of the unused abrasive slurry used for polishing the polishing target.

4. The abrasive slurry regeneration method according to claim 1, wherein the abrasive concentration is maintained within a range of 1 to 1000% mass % with respect to the abrasive concentration of the unused abrasive slurry used for polishing the polishing target.

5. The abrasive slurry regeneration method according to claim 1, wherein the regenerated abrasive slurry comprises the abrasive particles and the first additive.

6. The abrasive slurry regeneration method according to claim 1, wherein the collected used abrasive slurry further comprises a second additive having a molecular weight of 500 or less and a component derived from the polishing target, and during the regenerating, the second additive and the component derived from the polishing target are removed from the collected used abrasive slurry.

7. The abrasive slurry regeneration method according to claim 6, wherein the second additive and the component derived from the polishing target are removed from the collected used abrasive slurry by a continuous filtration process.

8. The abrasive slurry regeneration method according to claim 1, wherein the solvent is water.

9. An abrasive slurry regeneration method for regenerating a used abrasive slurry that has been used for polishing a polishing target, where the polishing target contains silicon oxide as a main component, and the used abrasive slurry contains abrasive particles and a plurality of kinds of additives including a first additive having a molecular weight of 500 or more, the first additive being adsorbed on the abrasive particles, the method comprising:

maintaining an abrasive concentration during the regenerating within a range of 0.2 to 3000% mass % with respect to an abrasive concentration of an unused abrasive slurry used for polishing the polishing target, wherein the regenerating includes a polishing target dissolution process of dissolving a polishing target contained in the collected used abrasive slurry by adding a solvent to the collected used abrasive slurry, and the solvent does not contain an electrolyte.

10. The abrasive slurry regeneration method according to claim 9, wherein the solvent is water.

11. An abrasive slurry regeneration apparatus comprising:

a filter filtration device for regenerating a collected used abrasive slurry to obtain a regenerated abrasive slurry, the filter filtration device comprising a tank, a filtration filter, and a circulation pipe connecting the tank and the filtration filter, wherein an abrasive concentration is maintained during the regenerating within a range of 0.2 to 3000% mass % with respect to an abrasive concentration of an unused abrasive slurry used for polishing the polishing target, wherein the regenerating includes a polishing target dissolution process of dissolving a polishing target contained in the collected used abrasive slurry by adding a solvent to the collected used abrasive slurry, and the solvent does not contain an electrolyte, and wherein the collected used abrasive slurry is obtained by collecting a used abrasive slurry that has been used for polishing a polishing target, the polishing target containing silicon oxide as a main component, the collected used abrasive slurry comprising abrasive particles and a plurality of kinds of additives including a first additive having a molecular weight of 500 or more, the first additive being adsorbed on the abrasive particles, and wherein the circulation pipe directly connects the tank and the filtration filter, the filtration device further comprises a second circulation pipe directly connecting the tank and the filtration filter, the collected used abrasive slurry flows from the tank to the filtration filter through the circulation pipe, and the collected used abrasive slurry flows from the filtration filter to the tank through the second circulation pipe.

12. The abrasive slurry regeneration apparatus according to claim 11, wherein the solvent is water.

13. The abrasive slurry regeneration apparatus according to claim 11, wherein the circulation pipe directly connects the tank and the filtration filter via a pump and a three-way valve.

\* \* \* \* \*